United States Patent [19]
Jokschas et al.

[11] Patent Number: 5,660,607
[45] Date of Patent: Aug. 26, 1997

[54] APPARATUS FOR SEPARATING OIL AEROSOLS FROM AIR

[75] Inventors: Guenter Jokschas, Murrhardt; Lothar Keller, Stuttgart; Michael Wolf, Gaeufelden, all of Germany

[73] Assignee: Filterwerk Mann & Hummel GmbH, Ludwigsburg, Germany

[21] Appl. No.: 518,419

[22] Filed: Aug. 23, 1995

[30] Foreign Application Priority Data

Aug. 23, 1994 [DE] Germany .................. 44 29 822.6

[51] Int. Cl.⁶ .................................................. B01D 46/00
[52] U.S. Cl. .................. 55/350.1; 55/484; 55/498; 55/502; 55/DIG. 25; 96/189
[58] Field of Search ........................ 55/343, 350.1, 55/484, 498, 503, 510, 502, DIG. 17, DIG. 25; 96/121, 133, 189, 190, 191, 192

[56] References Cited

U.S. PATENT DOCUMENTS

| | | | |
|---|---|---|---|
| 3,093,469 | 6/1963 | Woolston et al. | 55/DIG. 25 |
| 3,307,335 | 3/1967 | Shomaker | 55/484 |
| 4,385,913 | 5/1983 | Lane | 55/484 |
| 4,632,682 | 12/1986 | Erdmannsdörfer et al. | |
| 4,673,419 | 6/1987 | Kojima | 55/DIG. 17 |
| 4,713,094 | 12/1987 | Yanagawa et al. | 55/DIG. 17 |
| 4,714,483 | 12/1987 | Koening et al. | 55/DIG. 17 |
| 4,877,521 | 10/1989 | Petrucci et al. | 55/484 |
| 5,174,798 | 12/1992 | Luby | 55/DIG. 17 |
| 5,194,149 | 3/1993 | Selbie et al. | 55/343 |

FOREIGN PATENT DOCUMENTS

| | | | |
|---|---|---|---|
| 210363 | 2/1987 | European Pat. Off. | |
| 581178 | 2/1994 | European Pat. Off. | |
| 2560063 | 8/1985 | France | 55/DIG. 17 |
| GM1913949 | 4/1965 | Germany. | |
| GM1942117 | 7/1966 | Germany. | |
| 3311682 | 10/1984 | Germany. | |
| GM8501736 | 10/1985 | Germany. | |
| U 8501736 | 10/1985 | Germany. | |
| 3534161 | 4/1987 | Germany. | |
| 3909402 | 9/1990 | Germany. | |
| 3920489 | 1/1991 | Germany. | |
| 61-157320 | 7/1986 | Japan | 55/DIG. 17 |

*Primary Examiner*—C. Scott Bushey
*Attorney, Agent, or Firm*—Evenson, McKeown, Edwards & Lenahan P.L.L.C.

[57] ABSTRACT

An apparatus for separating an oil aerosol from air, including a separating element which is configured as an annular coalescer which coalesces the oil or oil mist in a known manner into larger oil drops which settle by gravity in the separating element and downstream therefrom. The separating element is disposed in a housing and fastened to a flanged piece, the flange piece including an adapter element to which additional flanged pieces and/or connecting lines for supplying and carrying away the air are attached.

16 Claims, 3 Drawing Sheets

APPARATUS FOR SEPARATING OIL AEROSOLS FROM AIR

BACKGROUND OF THE INVENTION

This invention relates to an apparatus for separating an oil aerosol from air comprising a separating element disposed in a housing which in turn is attached to a flanged piece, the separating element being configured as an annular coalescer which coalesces the oil mist in a known manner into larger oil drops which settle out by gravity downstream of the separating element.

Published German Patent Application No. DE-OS 3,311, 682 discloses an air drying apparatus for compressed air apparatus driven by a compressor, especially air brake apparatus of motor vehicles. It operates with a drying agent which has a limited absorptive capacity and has to be changed frequently depending on the amount of liquid contained in the un-dried air.

Furthermore, German Utility Model No. DE-U 85/01,736 discloses an air de-oiling element. This is constructed in the manner of a replaceable filter. This means that the coalescer is disposed in a replaceable element. This replaceable element can be fastened to a separator head with a central mounting thread. A disadvantage of this known oil separator is that it is designed for only a limited air throughput. To establish optimum operating conditions it is necessary to maintain the design air throughput as precisely as possible. Adaptation to other operating conditions is possible only by varying the length of the replaceable element. This, however, can only be done to a limited extent. A change of diameter is not possible on account of the adaptability of the replaceable element to the separator head.

SUMMARY OF THE INVENTION

It is the object of the invention to provide an apparatus for the separation of oil aerosol from air, which will be of modular design so that it can be readily expanded.

A further object of the invention is to provide an apparatus for separating an oil aerosol from air, which is adaptable to any operating conditions in a simple manner.

These and other objects are achieved in accordance with the present invention by providing an apparatus for separating an oil aerosol from air comprising a separating element which is configured as an annular coalescer which coalesces an oil mist in a known manner into larger oil drops in the separating element which drops settle downwardly by gravity downstream from the oil separator, the separating element being disposed in a housing, and the housing being fastened to a flanged piece, wherein the flanged piece comprises an adapter element on which connecting lines for supply and removal of the air, and/or additional flanged pieces can be arranged.

The essential advantage of the invention is to be seen in the fact that the flanged piece is configured as an adapter element. Thus, it is possible to arrange a plurality of separator elements in parallel, and thus the apparatus for removal of oil from air can be adapted optimally to the prevailing operating conditions. Precisely in the case of separating oil from air it is especially important that the optimal operating conditions be sustained, i.e., the velocity of the air through the oil separator or through the separating fleece is the decisive criterion for the design and dimensions of the air de-oiling element.

If the air velocity is too high, there is a danger that the air will entrain oil and will not be de-oiled to a sufficient extent. If the air velocity is too low the separated oil droplets will be unable to coalesce into larger drops and drain away. Thus it is clear that it is not possible, for example, to provide a relatively large separator element and design it for the maximum air throughput even if operating conditions occur wherein only a very low air throughput prevails.

This example shows that the invention results not only in high potential savings due to its modular construction, but also that the quality of the air cleaning and air de-oiling, is substantially improved. One embodiment of the invention provides for equipping the air exhaust connection with a minimum-pressure valve. Thus any flow-back of air is effectively prevented and permits the air to enter the compressed-air line only after a minimum pressure (threshold pressure) is reached.

Another advantageous embodiment of the invention calls for providing the separating element with an appropriate bolted flange and for mounting it by this flange. Alternatively, the separating element can also be fastened to the flange part through a compression spring and appropriate sealing means.

In accordance with one embodiment of the invention the coalescer element is connected to the housing through a pull-off device. As soon as the housing is removed, the coalescer element is thus also released and can be drawn off with the housing. The pull-off device is, for example, a snap fastener or a hook fastener which releasably fastens the coalescer element to the housing.

In another embodiment the coalescer element can be disposed either suspended downwardly or mounted upright. In the case of the upright arrangement, the separated oil collects in an annular channel from which it flows out. In the case of a downwardly suspended arrangement, a suction tube is provided which extends into the coalescer element and aspirates out the oil collecting on the bottom of the coalescer element.

BRIEF DESCRIPTION OF THE DRAWINGS

The invention will be explained in further detail hereinafter with reference to representative preferred embodiments illustrated in the accompanying drawings in which.

DETAILED DESCRIPTION OF THE PREFERRED EMBODIMENTS

Figure 1:
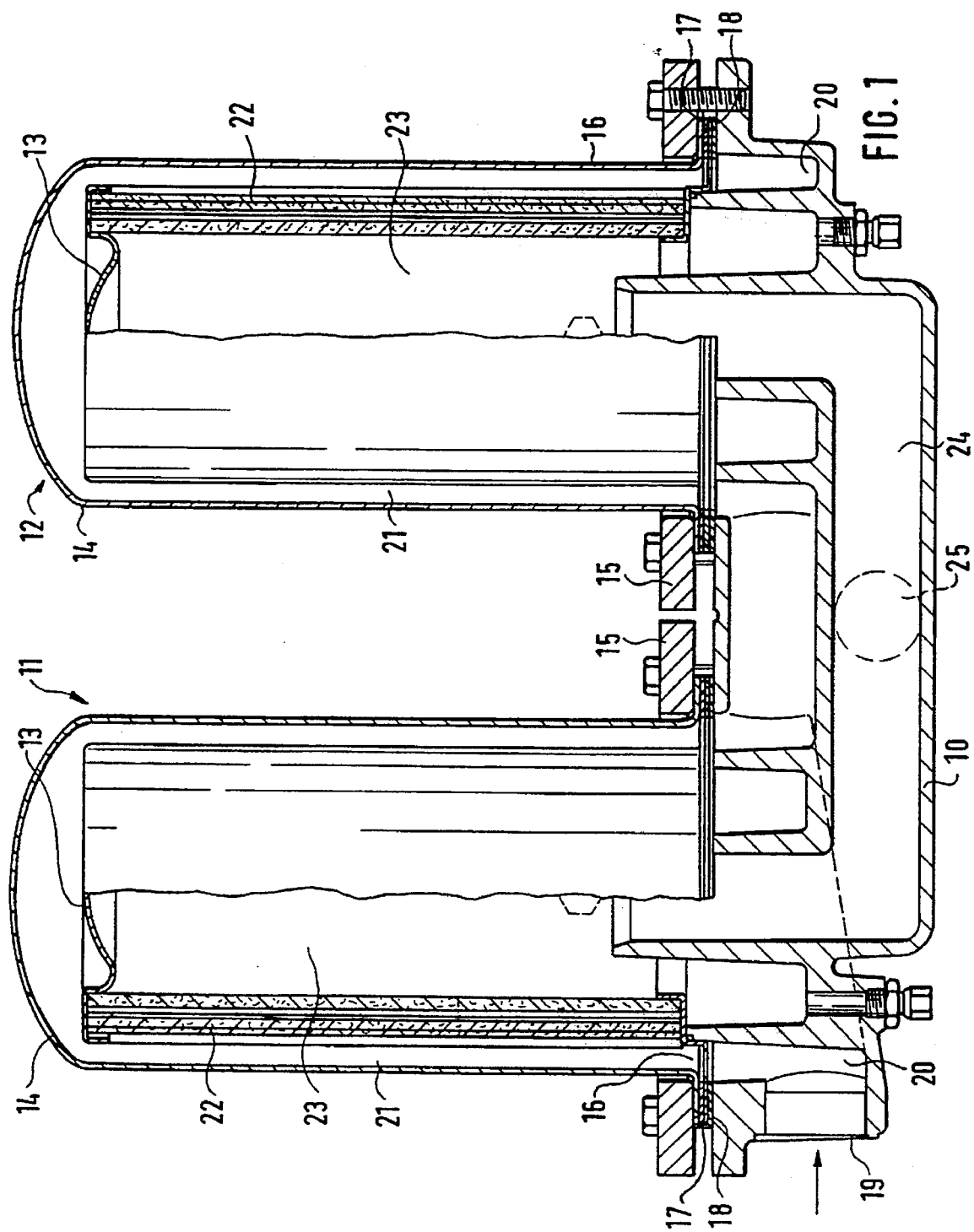
FIG. 1 shows a parallel arrangement of two air de-oiling elements in a single-casting construction.

FIG. 1 shows two air de-oiling elements 11 and 12 which are fastened on a flanged piece 10. The air de-oiling elements each consist of an oil separator 13, a housing 14 and annular flanges 15. Annular flange 15, housing 14 and oil separator 13 in each case form a removable unit disposed on the flanged piece 10. In order to replace the oil separator 13, the annular flange 15 is loosened and the housing 14 is removed. Since the oil separator 13 is likewise held by the annular flange 15, only a few components are necessary in this case. Suitable flat gaskets 17 and 18 need to be provided for sealing between the housing 14 and the annular flange 15 and the oil separator flange 16.

The air to be de-oiled flows through the inlet opening 19 and distributing channels 20 into the outer chambers 21 of the two oil separators 13. Then this air flows through the coalescer element 22 of each oil separator and leaves through the inner chamber 23 of each oil separator 13. The de-oiled air passes through the outlet channel 24 and the exhaust opening 25 in the flanged piece 10 to the apparatus that is not shown here.

In the system shown in FIG. 1, it is possible to operate both oil separators in parallel. This has already been described. It is also possible, however, to operate only one of the two oil separators, or to operate them in alternation by means of a suitable changeover valve which can be disposed in the flanged piece 10. Thus this apparatus can be adapted to different operating conditions.

Figure 2:
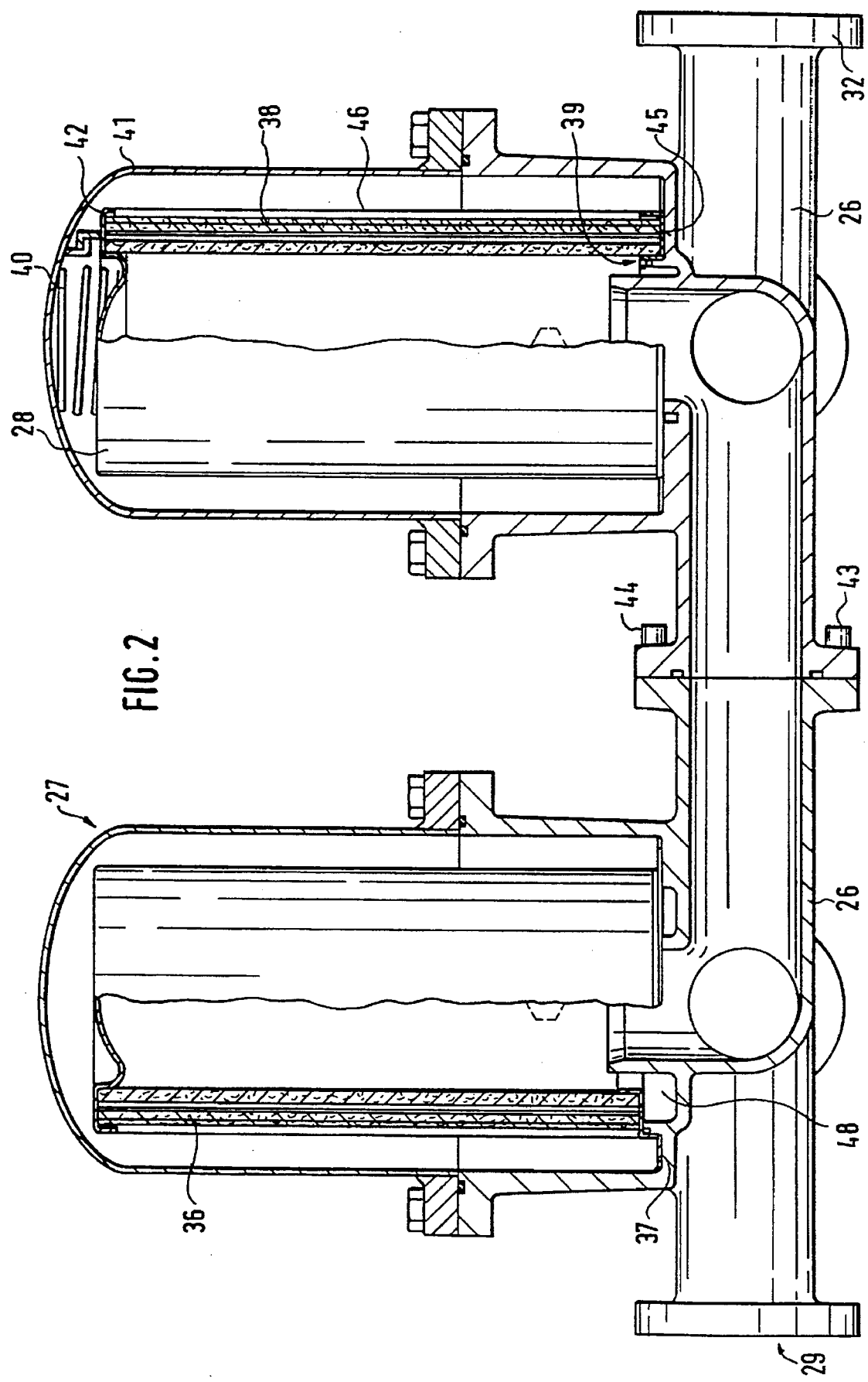
FIG. 2 represents another variant of a parallel arrangement of the modular type.

The variant according to FIG. 2 is an apparatus which permits a still greater variety of embodiments. In this case the apparatus can be adapted to virtually any conceivable conditions of operation, since the corresponding flanged piece 26 is configured such that, merely by attaching additional flanged pieces of a parallel circuit, any desired number of air de-oiling elements 27, 28, is possible.

Figure 3:
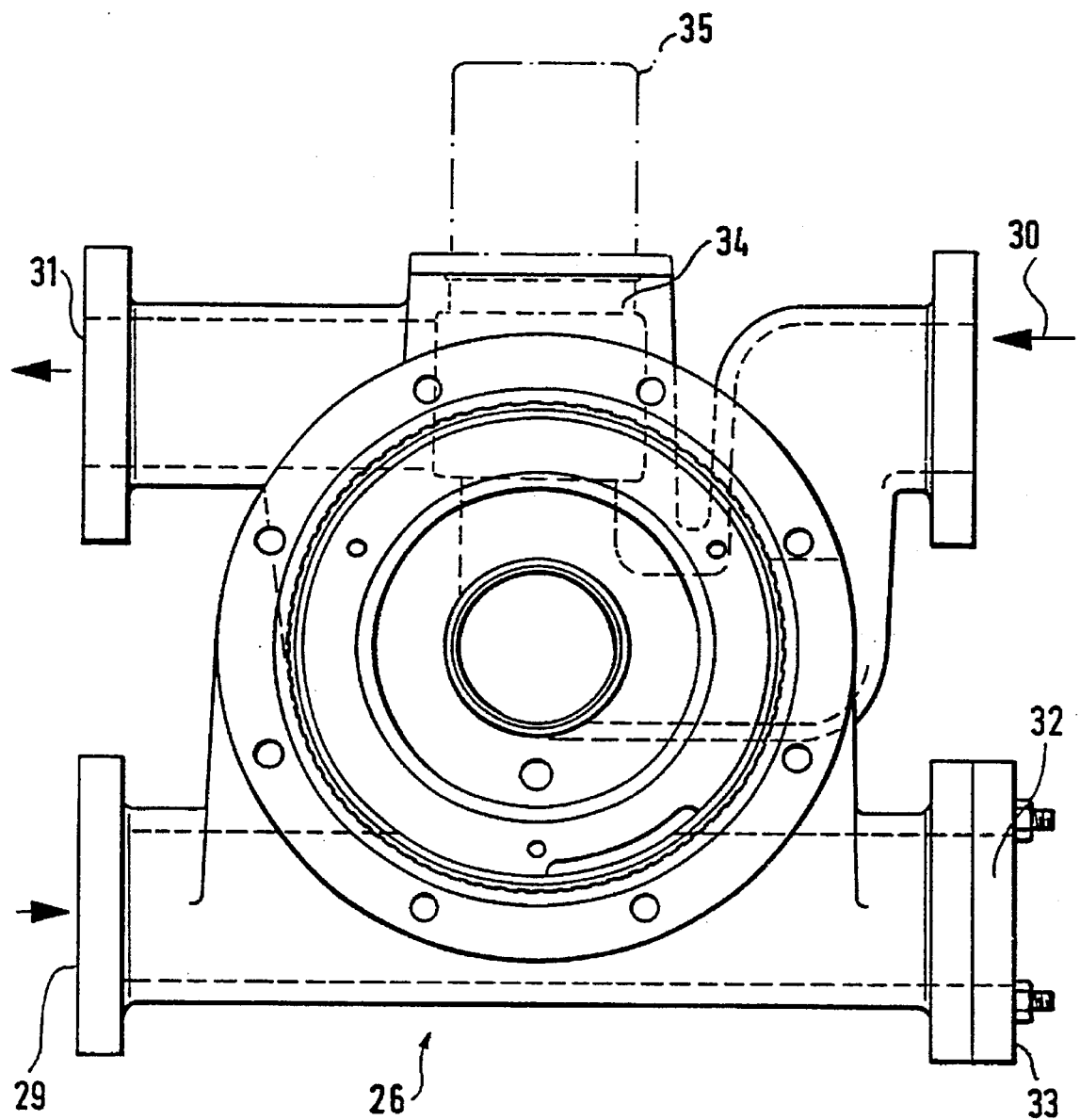
FIG. 3 shows a top plan view of the embodiment of FIG. 2.

FIG. 3 illustrates how the individual flanged pieces 26 may be connected together. Each flanged piece has two inlet openings 29 and 30, inlet opening 29 serving for the air to be cleaned and inlet opening 30 for the air already cleaned by another air de-oiling element arranged parallel thereto. The outlet opening 32 serves for delivering the oil-laden air fed through the inlet opening 29, parallel to the next air de-oiling element not shown here. The outlet opening 31 serves for feeding the cleaned air to the apparatus being driven. If no additional, parallel connected air de-oiling element is provided, as indicated at the outlet opening 32, the latter is closed by means of a closure element 33.

In FIG. 3 an additional minimum-pressure valve 35 is provided in the outlet passage 34 to prevent back-flow of de-oiled air.

The air de-oiling elements 27 and 28 shown in FIG. 2 are of a different construction. Whereas in the air de-oiling element 27, the coalescer element 36 is fastened through a flange 37 to the flanged piece 26, the coalescer element 38 is merely placed on a radial gasket 39 of the flanged piece 26. By means of a compression spring 40, which is held between the housing 41 and end plate 42 of the coalescer element, the coalescer element is fixed in the position shown. Instead of the compression spring 40, any other hold-down system can be used. The variant shown on the right side has the advantage that, when the coalescer element 38 is changed, it is only necessary to take off the housing 41, and no other screw connections are unscrewed. The two flanged pieces 26 are bolted together by flanges and 44.

The embodiments according to FIGS. 1 and 2 are basically possible either in an upright or in a downwardly suspended position. In the case of the upright embodiment, the separated oil is delivered via an annular channel 48 to a permanent drainage line. In the downwardly suspended embodiment, the oil collects in the dome of the coalescer element 36, 38, and exits through a centrally disposed drainage line extending into the element.

Both of the coalescer elements 36 and 38 are fully recyclable, i.e., by appropriate measures the end plates 42 and 45 and the metal central tube 46 are removed and possibly reused. The coils of fleece-like material of the coalescer element can be disposed of thermally, for example.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for separating an oil aerosol from air comprising a plurality of separating elements connected in parallel, each of the separating elements being configured as an annular coalescer which coalesces an oil mist into larger oil drops which settle downwardly by gravity, each of the separating elements being disposed in a respective housing, and the housings being fastened to at least one flanged piece, wherein each flanged piece comprises an inlet for the oil mist, an outlet for de-oiled air, and a channel for draining the oil.

2. An apparatus according to claim 1, further comprising a minimum-pressure valve provided on the outlet to prevent backflow of air.

3. An apparatus according to claim 1, wherein the separating element is fastened to the flanged piece by a threaded flange.

4. An apparatus according to claim 1, wherein the separating element or the flanged piece has a gasket for sealing between the inlet and the outlet, said gasket being supported by the housing.

5. An apparatus according to claim 4, wherein said gasket is a radial gasket.

6. An apparatus according to claim 4, wherein said gasket is an axial gasket.

7. An apparatus according to claim 1, wherein the coalescer element is mounted above the flanged piece.

8. An apparatus according to claim 1, wherein said at least one flanged piece comprises a single flanged piece which is configured to receive said plurality of separating elements.

9. An apparatus according to claim 8, wherein said inlet for the oil mist communicates with outer chambers defined by an outer surface of each of said separating elements and an inner surface of said respective housing, and wherein said outlet for the de-oiled air communicates with inner chambers defined by an inner surface of each of said separating elements.

10. An apparatus according to claim 1, wherein said at least one flanged piece comprises a plurality of flanged pieces corresponding in number to said plurality of separating elements.

11. An apparatus according to claim, 10, wherein each of said flanged pieces further comprises an outlet for the oil mist, and an inlet for the de-oiled air.

12. An apparatus according to claim 11, wherein said plurality of flanged pieces are connected to each other such that said outlet for the oil mist of one of the flanged pieces communicates with said inlet for the oil mist of an adjacent of the flanged pieces, and such that said outlet for the de-oiled air of said adjacent of the flanged pieces communicates with said inlet for the de-oiled air of said one of the flanged pieces.

13. An apparatus according to claim 11, wherein said inlet for the oil mist and said outlet for the de-oiled air extend to a first lateral side of said separating element.

14. An apparatus according to claim 12, wherein said inlet for the oil mist and said outlet for the de-oiled air extend to a first lateral side of said separating element.

15. An apparatus according to claim 13, wherein said outlet for the oil mist and said inlet for the de-oiled air extend to a second lateral side of said separating element, said second lateral side being opposite said first lateral side.

16. An apparatus according to claim 14, wherein said outlet for the oil mist and said inlet for the de-oiled air extend to a second lateral side of said separating element, said second lateral side being opposite said first lateral side.

* * * * *